United States Patent [19]

Hancox

[11] 4,086,682
[45] May 2, 1978

[54] DEVICE FOR USE IN THE HUMANE SLAUGHTERING OF ANIMALS

[75] Inventor: Roger John Hancox, Burntwood, England

[73] Assignee: Accles and Shelvoke Limited, Birmingham, England

[21] Appl. No.: 726,754

[22] Filed: Sep. 27, 1976

[30] Foreign Application Priority Data

Oct. 3, 1975 United Kingdom ............... 40451/75

[51] Int. Cl.² .............................................. A22B 3/02
[52] U.S. Cl. ...................................... 17/1 B; 42/1 M
[58] Field of Search ..................... 17/1 B; 42/1 M, 10, 42/70 R; 277/10, 11

[56] References Cited

U.S. PATENT DOCUMENTS

| 516,236 | 3/1894 | Stahel | 42/1 M |
|---|---|---|---|
| 1,569,153 | 1/1926 | Tempee | 17/1 B |
| 2,397,572 | 4/1946 | Weaver | 42/10 |
| 2,930,042 | 3/1960 | Temple et al. | 42/10 |
| 3,067,454 | 12/1962 | Catlin et al. | 17/1 B |
| 3,068,601 | 12/1962 | Arrowsmith | 17/1 B |
| 3,275,209 | 9/1966 | Hansen | 227/10 |
| 3,727,337 | 4/1973 | Hancox | 17/1 B |
| 3,895,454 | 7/1975 | Hancox | 17/1 B |
| 3,899,113 | 8/1975 | Brack | 227/10 |
| 3,918,619 | 11/1975 | Termet | 227/10 |

Primary Examiner—Louis G. Mancene
Assistant Examiner—Paul J. Hirsch
Attorney, Agent, or Firm—Imirie, Smiley & Guay

[57] ABSTRACT

A captive bolt pistol device for use in the humane slaughtering of animals comprising two separable parts comprising a hollow cap or sleeve housing a fixed firing pin at the closed end thereof and a barrel housing the captive bolt and having a breech block at one end. The breech block is formed with a cartridge chamber which opens to the rear face of the breech block and to an expansion chamber behind the bolt. The barrel is slidably engageable with the cap and to fire the pistol a cartridge is placed within the cartridge chamber and the barrel and cap are interengaged and moved relative one to the other on impact of the muzzle end of the pistol with an animal's head so that the cartridge strikes, or is struck by, the firing pin. The two parts of the device are separated for reloading.

10 Claims, 10 Drawing Figures

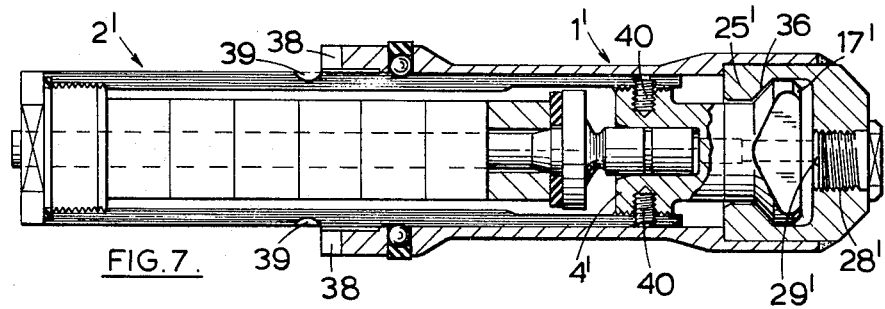
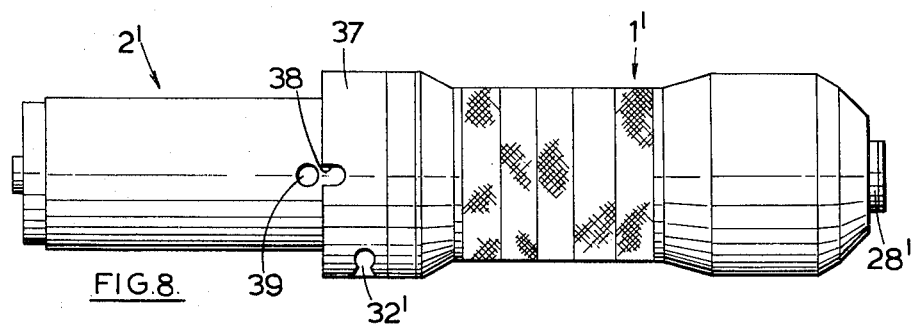
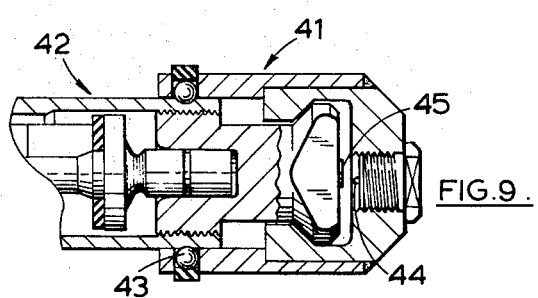
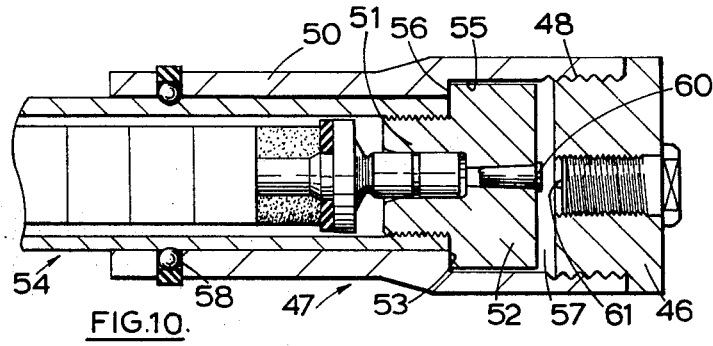

4,086,682

DEVICE FOR USE IN THE HUMANE SLAUGHTERING OF ANIMALS

BACKGROUND

1. Field of Invention

This invention relates to devices, such as pistols of the captive bolt type for use in the humane slaughtering of animals. In devices of this type the bolt is accommodated within and coaxially of the barrel of the device and is adapted to be driven lengthwise of the barrel by an explosive force applied thereto when a blank cartridge is fired in a breech block of the device.

2. Description of the Prior Art

A pistol device of the kind set forth is known from U.S. Pat. No. 3,727,337 which relates to a device including a sophisticated trigger and cocking mechanism. A pistol device of the kind set forth incorporating a fixed firing pin is known from U.S. Pat. No. 3,895,454, but in this device the barrel is moved rearwardly relative to the body of the device in order to strike the cartridge against the fixed firing pin. The rearward movement occurs when the muzzle of the device is struck against an animal's head. This latter patent introduced a new concept in a step towards the simplification of such devices.

SUMMARY OF THE INVENTION

It is an object of this invention to provide a device of the kind set forth utilising the principle of the fixed firing pin and reciprocal breech block but which is of greatly simplified form and has many advantages deriving from this simplicity. For example, the device can be more cheaply manufactured, semi-skilled labour can be used in manufacture and assembly of the device and in use in the field little or no maintenance is required and therefore the necessity of holding stocks of spare parts is avoided.

According to this invention there is provided a captive bolt pistol device for use in the humane slaughtering of animals comprising: a hollow cap having a closed end and housing a fixed firing pin, and a barrel slidably received within said cap for respective relative movement and being readily separable for loading purposes, said barrel housing the captive bolt and having a breech block with a cartridge chamber at one end, said chamber opening to the rear end of said bolt and to the rear face of said breech block, and barrel retention means for separably coupling said barrel and cap together for use and for retaining said barrel and said cap in a firing position in which said firing pin is aligned with said cartridge chamber but spaced from said rear face, said barrel retention means being overridden by an impact force resulting from tapping the muzzle end of the device on an animal's head so producing relative movement between said cap and said barrel whereby a cartridge within said chamber impacts with said firing pin to fire such cartridge and shoot the bolt.

"Firing position" is defined as the relative spaced positions of the rear face of the breech block and the firing pin in which the barrel and cap are free to move together once the barrel retention means is overridden by the operative blow on the animal's head.

The barrel and the cap are preferably of round cross-section but may be of other section, rectangular or triangular for example.

Preferably the device is provided with safety means for preventing the inadvertent firing of the device, and may be provided with means for preventing the inadvertent separation of the two parts. The two means may be common.

The safety means may comprise various complementary formations on the end of the breech block and on the hollow cap which constitute stops or abutments making it essential for the operator to perform more than one movement on the device before the device can be fired. For example, a head portion provided on one end of the barrel and having opposed flats may be required to be aligned with a gap or gate in the cap before the barrel can be made to move rearwardly a full stroke.

A cylindrical barrel and cap may be provided with coarse complementary screw threads past which the barrel or the cap must be screwed to bring the device into the firing position.

The cap may be provided with a detachable back plate with a fixed firing pin, the back plate being screwed onto the end of a cylindrical body portion of the cap for each operation of the device.

Helical grooves may be provided on the barrel or on the cap which are engaged by a pin and act in a similar manner to the above-mentioned screw thread arrangement.

In another arrangement the cap or the barrel may be provided with a longitudinally extending slot or hole which slidably receives a peg or stem on the other part of the device when the two parts are rotated so as to be in register.

In yet another arrangement the barrel may be of such length that it can be used as a gripping surface by the operator and the cap may be arranged so that in operation it moves towards the muzzle of the device under its own inertia when the muzzle end of the barrel strikes the animal's head.

The device essentially comprises barrel retention means which maintains the spacing of the breech block from the firing pin prior to the moment of impact of the muzzle end of the device on the animal's head. The barrel retention means may comprise a spring loaded detent which retains the device in the cocked position. The detent may be in the form of an annular groove formed on the barrel which is engaged by a series of balls trapped in holes in the cap and urged into engagement with the groove by a resilient ring or spring circlip. Alternatively, such balls may be dispensed with and the cap or the barrel may be provided with a spring loaded plunger protruding from an end face thereof. Thus in order to fire the device the force of the spring must be overcome.

Either the cap or the barrel may be used as the gripping portion and the outer surface of these parts is preferably roughened to provide a gripping surface for the operator's hand but a handle or grip may be provided if desired.

Extractor means for extracting a spent cartridge from the breech block is preferably provided as an integral part of the cap portion but may also be provided as a separate tool.

The captive bolt may be formed with a penetrating head or it may be formed with a head of any other form, as required, for example, in the shape of a mushroom.

BRIEF DESCRIPTION OF THE DRAWINGS

Exemplary embodiments of this invention will now be described with reference to the accompanying drawings wherein:

FIG. 7 is a longitudinal section similar to FIG. 1 of a modified form of the device of FIGS. 1 to 6, FIG. 8 is an outside view of the device of FIG. 7, FIG. 9 is a longitudinal section of the breech end of a device of this invention according to a second embodiment and, FIG. 10 is a longitudinal section of the breech end of a device of this invention according to a third embodiment.

DESCRIPTION OF THE PREFERRED EMBODIMENTS

Figure 1:
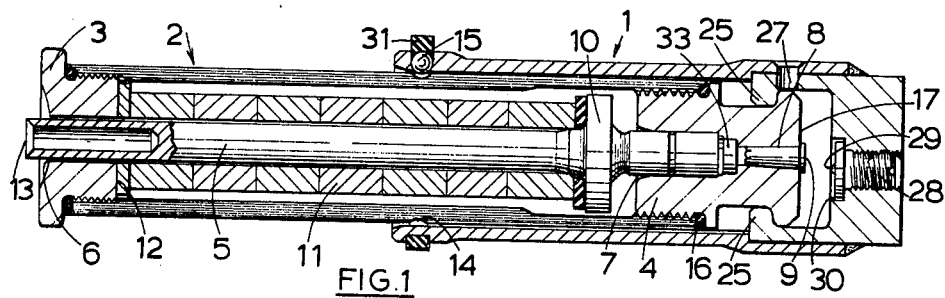
FIG. 1 is a longitudinal section on the centre line of the device shown in the firing position.

In a first embodiment of the device the cap 1 is formed as a hollow cylinder of steel which is closed at one end. The barrel 2 is formed as a cylindrical plunger which is a slidable fit in the cap 1 and of such length that, when the two parts are assembled and in the firing position, approximately half the length of the barrel is received within the cap and the other half protrudes therefrom.

The barrel 2 also comprises a hollow cylinder of steel in one end of which is secured a muzzle 3 and in the other end of which is secured a breech block 4. A captive bolt 5 is slidably located within the barrel, supported at the front end within a central bore 6 of the muzzle and at the rear end within a central bore 7 within the breech block. The latter central bore 7 communicates with a cartridge chamber 8 which opens to the rear face of the breech block 4. Thus the rear end of the bolt 4 acts as a piston which moves the bolt 5 lengthwise of the barrel 2 as a result of gas expansion on the firing of a cartridge 9. Forward of the rear end the bolt carries an annular flange 10 which provides an abutment for a series of resilient sleeves 11 mounted on the bolt 5 between the annular flange 10 and the rear face 12 of the muzzle. These resilient sleeves absorb the forces of the explosion and return the bolt to its inoperative position in known manner. In this embodiment the bolt is formed with a penetrating head 13 of the same diameter as the bolt shaft and which protrudes only slightly from the end of the muzzle in the inoperative position. At an intermediate position, between the muzzle 3 and the breech block 4, the barrel 2 is formed with an external annular groove 14 extending around the periphery of the barrel which serves as a detent for locating a series of co-operating resiliently loaded balls 15 held within the cap 1, the purpose of which will be described in detail hereinafter.

The breech block 4 is screwed into a counterbore in the end of the barrel 2 and locked in position by means of a lock washer 16. The end of the barrel 2 is closed by the breech block 4 and that part of the breech block 4 which protrudes from the rear end of the barrel 2 has special formations which co-operate with formations in the cap 1 and constitute safety means in operation of the device. The special external formations on the end of the breech block 4 comprise a flat-headed portion 17 which is connected to an intermediate shouldered portion 35 by means of a cylindrical neck 18 of reduced diameter. The flat-headed portion 17 has opposed rounded wing portions 19, comprising first abutment means, of slightly less diameter than the outside diameter of the barrel 2 and two opposed flat faces 21 defined by straight edge portions adjacent to the rounded wing portions. The shouldered portion 35 of the breech block 4 opposite each of the aforementioned flat faces 21 is formed with opposed stepped shoulders 22 having semicircular flat faces extending normally to the axis of the barrel and comprising second abutment means. Each flat face is undercut slightly below the base of the neck 18 to provide a step 23 and this comprises third abutment means and constitutes an important secondary safety feature as will be described in more detail later. That part of the shouldered portion 35 of the breech block 4 opposite each wing portion 19 is also formed with a flat face 24 extending in a plane normal to the flat faces 21 on the headed portion 17 and to the stepped shoulders 22. The flat faces 24 constitute part of the safety means and permit the barrel to move rearwardly clear of abutment means within the cap portion only in certain angular positions. The peripheral edge of each winged portion 19 carries a red index marker 26 at a central position on each wing which indicates to the operator the firing position, as in that position the red index marker 26 can be seen through an exhaust port 27 in the cap 1.

As aforementioned the cap 1 is formed as a hollow steel cylinder which is closed at one end. The closed end is drilled off-centre and screw threaded to receive an insert 28 carrying a fixed firing pin 29. The insert is fixed rigidly in the end of the cap with the firing pin 29 protruding through a small hole into a shallow circular recess 30 in the end of the cap. The recess 30 has a depth which is approximately the same as the thickness of the rim of a cartridge. This is an important feature which, in operation of the device, prevents the rim of the cartridge from being flattened against the end of the cap and obviates jamming in the cartridge chamber 8. Alternatively, the internal rear end face of the cap 1 may be machined to provide an integral firing pin so that the insert 28 may be dispensed with. The inner face of the cap wall is smooth so that the cap is easily slidable and rotatable on the barrel. Extending normally from the inner face of the cap wall adjacent to the closed end but spaced therefrom there are two opposed semicircular abutments 25, constituting a stop for the aforementioned first, second and third abutment means, the straight inner edges of which are parallel and spaced apart to provide a gap or gate. These abutments 25 also form part of the safety means referred to earlier herein, the operation of which will be described later. The forward end of the cap is provided with an annular groove in which six steel balls 15 are located in equispaced holes which extend through the wall of the cap, the purpose of which will be described later. The balls are held in place by means of a ring 31 of resilient material such as neoprene or rubber, which extends around the annular groove on the outside of the balls. The rear end of the cap portion is thickened for extra strength and is provided with a radial hole 27, constituting the exhaust port, extending to the inside of the cap which permits air to escape when the barrel is moved rearwardly and also provides a sight hole for the index marker 26 on each of the wings enabling the operator to check the firing position. The rear end of the cap is formed as a cylindrical boss the peripheral edge of which has a pair of opposed extraction slots 32 one or other of which may be used to extract a cartridge after operation of the device. The intermediate portion of the cap on the outside is knurled to provide a grooved and roughened gripping surface.

In the device of this invention the relative masses, thus inertias, of the barrel and the bolt are important, that of the barrel being essentially much greater than that of the bolt as will be explained in operation of the device. Also, in a device according to this particular embodiment the mass of the barrel portion may be greater than the mass of the cap portion as most of the recoil is absorbed through the operator's arm.

In operation of the device the two parts are first separated and a cartridge 9 is placed in the cartridge chamber 8 in the breech block 4 and the barrel 2 is then inserted in the cap 1 and moved rearwardly relative to the cap. As the barrel is entered into the cap randomly, that is without considering the relative positions of the wing portions 19 on the flat headed portion 17 of the barrel and the semi-circular abutments 25 in the cap, it is almost certain that the wings 19 will strike against the semi-circular abutments 25 at a first spaced position of the rear face of the breech block from the firing pin and thus prevent further movement of the barrel 2 unless it is rotated until the flat faces 21 on the side of the head 17 are parallel with the edges of the semi-circular abutments 25, which edges form the aforementioned gap or gate. In this position the wings 19 are no longer obstructed by the abutments 25 constituting said gap or gate and pass between them as the barrel is moved rearwardly towards the end of the cap. The barrel 2 having been moved rearwardly a further short distance the stepped shoulders 22 on the intermediate shouldered portion 35 of the breech block will in turn strike the semi-circular abutments 25 in the cap at a second spaced position of the rear face of the breech block from the firing pin, thus a second safety feature comes into operation and prevents premature firing of the device. If the operator attempts to force the barrel 2 further rearwardly and simultaneously to rotate it into the firing position he will be prevented from doing so by the right-angled step 23 formed on each of the shoulders 22 at the base of the neck 18, as either step 23 will contact an abutment 25 depending on the direction of intended rotation. Before the barrel 2 can be rotated into the firing position the operator must withdraw the barrel a short distance (approximately 2 mm) so that the right-angled steps 23 are clear of the semi-circular abutments 25. As the wing portions 19 on the head 17 are now behind the semicircular abutments 25 and the stepped shoulders 23 are out of contact therewith the barrel 2 may be rotated in either direction through 90° into the firing position. In this position the red index marker 26 on one or other of the wings will appear in the radial hole 27 in the cap. The barrel 2 is now held in this position by means of the resiliently loaded balls 15 which have entered the annular groove 14 on the barrel. In this position the rear face of the headed portion 17 of the breech block is still spaced from the firing pin 29 and it is essential that this spacing is maintained as the device is moved forwardly at the moment of use. The engagement of the balls 15 in the annular groove in the outer surface of the barrel serve as the barrel retention means in the firing position. The second pair of flat faces 24 on the intermediate shouldered portion of the breech block allow the barrel 2 to be moved rearwardly relative to the cap a final short distance to impact with the inner end face of the cap 1, once the resistance of the balls is overcome. To fire the device the cap 1 is gripped in one hand and the muzzle is struck against the animal's head whereupon the barrel 2 is forced rearwardly until the rim of the cartridge 9 strikes the firing pin 29 and fires the cartridge 9. The rim of the cartridge is not crushed as it enters the recess 30 in the end face of the cap.

As the cartridge explodes and the gases therefrom expand within an expansion chamber 33 behind the rear end of the bolt, the gas pressure acts in both rearward and forward directions simultaneously with equal force. However, as explained earlier, as the inertia of the body of the barrel 2 is by design much greater than that of the movable captive bolt 5 housed within the barrel the latter will be shot whilst the end of the breech block 4 is still in contact with the end of the cap portion 1. An instant later the force of the expanding gases will have overcome the inertia of the barrel 2 which then moves forwardly a short distance until the wings 19 contact the rear face of the semi-circular abutments 25. It is thus impossible for the two parts to separate when fired or when the device is pointed downwardly after firing. However, this feature is not essential to the operation of the device, as it merely prevents the barrel from falling to the ground and is obviously desirable.

In order to separate the barrel 2 from the cap 1 for reloading purposes the barrel is rotated through 90° in either direction relative to the cap, in which position the flat faces 21 on the head are again parallel with the sides of the semi-circular abutments 25 and the barrel can be withdrawn from the cap without the wings 19 being obstructed. One or other of the radial extraction slots 32 on the cap 1 may now be used to extract the spent cartridge 9. The bolt 5 returns to its original position in known manner by means of the resilient recuperating sleeves 11 positioned along the bolt.

Figures 2, 3:
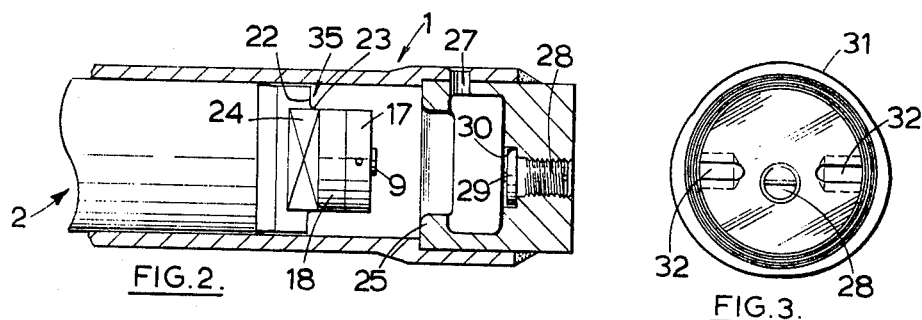
FIG. 2 is a partial section on the longitudinal centre line of the device showing the barrel rotated through 90° from the position shown in FIG. 1 and being pulled apart for reloading purposes.
FIG. 3 is an end view showing the closed end of the cap.
Figure 4:
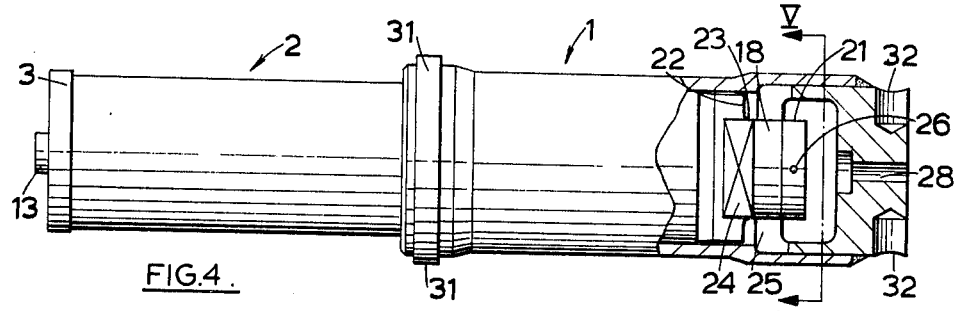
FIG. 4 is a similar view to FIG. 1 partly in section but with the device rotated through 90°.
Figures 5, 6:
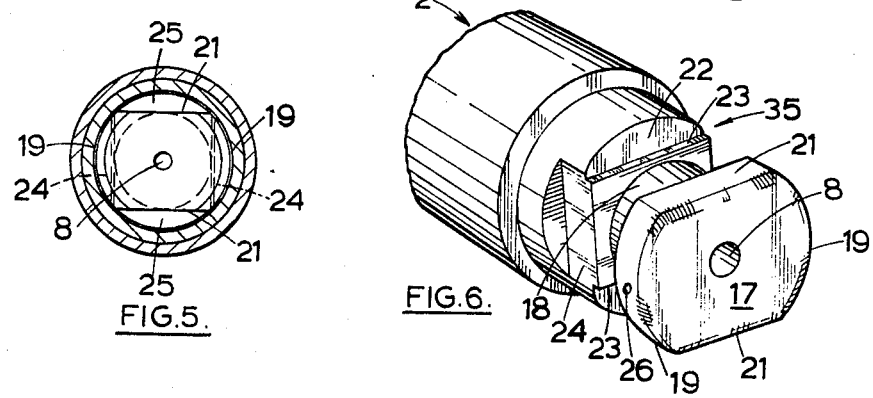
FIG. 5 is a section on the line V—V of FIG. 4.
FIG. 6 is a detail showing a perspective view of the breech block end of the barrel of the device of FIGS. 1, 2, 3, 4 and 5.

FIGS. 7 and 8 show a modified form of the device hereinabove described. As the structure is very similar and the operation is identical to the device shown in FIGS. 1 to 5, corresponding reference numerals will be used to identify corresponding parts. Also the description will be confined to modified features only.

A first modification provides for the semi-circular abutments 25' to be thickened and formed with angled abutment faces 36 for abutment with complementary abutment faces on the headed portion 17'. These abutment faces are at an angle of 45° to the longitudinal axis of the device and cause the forces resulting from the explosion of the cartridge to be thrown outwards. Thus, this part of the device is strengthened and capable of withstanding prolonged use with a more powerful cartridge. Secondly, for convenience and ease of production the insert 28' carrying the firing pin 29' is screwed into the end of the cap 1' from the outside. Flats are provided on the head of the insert 28' to permit ready removal should replacement be necessary. Thirdly, for convenience in use the extractor groove 32' is formed in an extended forward end portion 37 of the cap 1'. The end portion 37 is also provided with notches 38 which serve as index markers for the two possible firing positions of the device when aligned with dimples 39 formed in the barrel 2' and these replace the red index markers 26 of the first embodiment. Grub screws 40 provide a more positive lock for the breech block 4' where it is screwed into the end of the barrel 2' than the lock washer 16 as used in the device of the first embodiment.

According to a second embodiment of the invention as shown in FIG. 9, which caters for the possibility of providing a smaller and more compact device, the cap 41 is made relatively short as compared with the cap of the first embodiment and the barrel 42 consequently has a longer portion protruding from the cap 41 when the cap and barrel are interengaged and in the firing position. This arrangement enables the exposed barrel portion to be used as a hand grip for operation of the device instead of the cap 41. The cap 41 is held in the firing position on the barrel 42 in the same way as that of first embodiment, that is, by means of resiliently loaded steel balls 43 located in an annular groove on the outer surface of the barrel. To operate the device the barrel is gripped by the operator and at the instant the muzzle is tapped on the animal's head the cap 41 moves forward relative to the barrel 42 under its own inertia and the firing pin 44 strikes the rim of any cartridge 45 within the cartridge chamber to explode the same. In this embodiment the mass of the cap must be large enough to absorb the recoil of the explosion as this is no longer absorbed through the operator's arm. In all other respects the structure and operation of the device of this embodiment is the same as that herebefore described in connection with the embodiment of FIGS. 1 to 7 and further description is superfluous.

FIG. 10 illustrates a simplified embodiment of the device. In this embodiment the various formations on the end of the breech block constituting the safety means of the first and second embodiments are dispensed with and the device is simplified by providing a cap 47 having a detachable back plate 46. Before the breech block 49 and cartridge chamber therein can be exposed for reloading the back plate 46 must be removed. The back plate 46 is screwed into the end of the cap sleeve 50 by means of complementary coarse screw threads 48. It is, therefore, possible to remove and replace the back plate 46 quickly. The breech block 49 is formed as two coaxial cylindrical portions of different diameters providing an annular abutment face 53 intermediate the ends of the breech block 49 and extending normally to the axis of the barrel 54. The portion 51 of smaller diameter is screwed and locked in the end of the barrel 54 with the end face of the barrel abutting an inner radial extent of the abutment face 53. That end of the cap sleeve 50 which receives the back plate 46 is counterbored and a smooth axially inner extent 55 of this counterbore provides a cylindrical bearing surface for the larger end 52 of the breech block. The forward end of the sleeve counterbore terminates in an annular stop face 56 for the abutment face 53 of the breech block. As in previous embodiments of the device of this invention the barrel and breech unit is slidable within the cap and the cap 47 is held in the firing position, illustrated in FIG. 9, by means of a detent in the form of resiliently loaded balls 58 located in an annular groove on the outer surfaces of the barrel 54. When the device of this embodiment is in the firing position, that is, with the annular abutment 53 abutting the annular stop face 56 there is a gap 57 between the rear face of the breech block and the front face of the back plate 46. In operation the device is gripped around the cap 47 and the frictional force of the balls 58 is overcome by tapping the muzzle end of the barrel 54 on the animal's head, consequently the barrel and breech unit move rearwardly relative to the cap 47 and the rim of a cartridge 60 within the cartridge chamber strikes the firing pin 61 to fire the cartridge. In order to expose the cartridge chamber for reloading the back plate 46 is removed by unscrewing. The barrel 54 may now be withdrawn from the rear end of the cap 47 if necessary.

It will be appreciated from the foregoing description that many modifications are possible to these devices without departing from the scope of this invention as defined in the appended claims.

I claim:

1. A captive bolt pistol device for use in the humane slaughtering of animals comprising: a hollow cap having a closed end and housing a fixed firing pin, and a barrel slidably received within said cap for respective relative movement and being readily separable for loading purposes, said barrel housing the captive bolt and having a breech block with a cartridge chamber at one end, said chamber opening to the rear end of said bolt and to the rear face of said breech block, and barrel retention means for separably coupling said barrel and cap together for use and for retaining said barrel and said cap in a firing position in which said firing pin is aligned with said cartridge chamber but spaced from said rear face, said barrel retention means being overridden by an impact force resulting from tapping the muzzle end of the device on an animal's head so producing relative movement between said cap and said barrel whereby a cartridge within said chamber impacts with said firing pin to fire such cartridge and shoot the bolt.

2. A device as claimed in claim 1 including safety means for preventing inadvertent firing of the device.

3. A device as claimed in claim 2 wherein said barrel and cap are generally cylindrical and relatively rotatable and said safety means comprises first abutment means in the form of a headed portion on the end of said breech block and stop means for said first abutment means extending inwardly from the inner face of the cap wall adjacent said closed end, said headed portion and said stop means having complementary edge portions, said stop means serving to arrest rearward relative movement of said barrel within said cap at a first spaced position of said rear face from the firing pin, and said stop means constituting gate means for said headed portion permitting said headed portion to pass therethrough only in certain relative angular positions of said barrel and cap.

4. A device as claimed in claim 3 wherein said headed portion is joined to a shouldered portion of the breech block by a necked portion and said safety means comprises second abutment means formed on said shouldered portion, said second abutment means being axially spaced from said headed portion by said necked portion and engageable with said stop means at a second spaced position of said rear face from said firing pin.

5. A device as claimed in claim 4 wherein said safety means comprises third abutment means for preventing inadvertent disengagement of said second abutment means with said stop means by rotation of said barrel, said third abutment means being formed on said shouldered portion and engageable with said stop means.

6. A device as claimed in claim 5 wherein said barrel retention means comprises an annular groove formed in the outer surface of said cap adjacent the open end thereof, said groove having several equi-spaced locating holes which extend through the wall of said cap and each of which receives a ball, said balls being held within said holes by a resilient ring extending around said cap and in contact with each of said balls, said barrel also being provided with an annular groove on the outer surface thereof which engages said balls and permits relative rotation of said barrel and said cap whilst maintaining substantially said second spaced relationship between said firing pin and said rear face preparatory to firing said device.

7. A device as claimed in claim 1 wherein the length of said cap is relatively short as compared with the length of the said barrel whereby, when said cap and barrel are in said firing position a sufficient length of barrel protrudes from said cap to provide a gripping surface thereon for inertia operation of the device in which said cap moves relative to said barrel under its own inertia after said muzzle end strikes the animal's head.

8. A device as claimed in claim 1 wherein said cap is provided with a readily detachable back plate carrying said firing pin and which is removed to provide access to said cartridge chamber for loading purposes.

9. A device as claimed in claim 8 wherein said back plate is screwed to the end of a sleeve part of said cap by means of coarse screw threads.

10. A device as claimed in claim 1 wherein said barrel and said cap carry indexing means for indicating said firing position.

* * * * *